United States Patent
Colvin et al.

(10) Patent No.: US 8,122,986 B2
(45) Date of Patent: Feb. 28, 2012

(54) POWERTRAIN AND METHOD FOR CONTROLLING A POWERTRAIN IN A VEHICLE

(75) Inventors: Daniel Scott Colvin, Farmington Hills, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 12/498,783

(22) Filed: Jul. 7, 2009

(65) Prior Publication Data

US 2011/0005850 A1 Jan. 13, 2011

(51) Int. Cl.
*B60W 10/08* (2006.01)

(52) U.S. Cl. .............. 180/65.285; 180/65.25; 60/702; 123/565

(58) Field of Classification Search ........... 180/65.21, 180/65.25, 65.26, 65.285; 60/605.1, 607, 60/608, 700, 702, 719; 123/179.25, 179.28, 123/565

See application file for complete search history.

(56) References Cited

U.S. PATENT DOCUMENTS

| | | | |
|---|---|---|---|
| 4,805,409 A | 2/1989 | Kobayashi | |
| 4,901,530 A | 2/1990 | Kawamura | |
| 4,981,017 A | 1/1991 | Hara et al. | |
| 5,064,423 A | 11/1991 | Lorenz et al. | |
| 5,881,559 A | 3/1999 | Kawamura | |
| 5,916,130 A | 6/1999 | Nakae et al. | |
| 6,305,169 B1 | 10/2001 | Mallof | |
| 6,318,083 B1 | 11/2001 | Machida et al. | |
| 6,338,391 B1 | 1/2002 | Severinsky et al. | |
| 6,365,983 B1 | 4/2002 | Masberg et al. | |
| 6,478,100 B1 | 11/2002 | Grewe | |
| 6,554,088 B2 | 4/2003 | Severinsky et al. | |
| 6,735,945 B1 | 5/2004 | Hall et al. | |
| 6,840,045 B2 | 1/2005 | Kusase | |
| 6,847,189 B2 | 1/2005 | Frank | |
| 6,865,888 B2 | 3/2005 | Gründl et al. | |
| 7,028,793 B2 | 4/2006 | Hu et al. | |
| 7,174,714 B2 | 2/2007 | Algrain | |
| 2004/0016419 A1 | 1/2004 | Satou et al. | |
| 2004/0163860 A1 | 8/2004 | Matsuzaki et al. | |
| 2007/0125083 A1 | 6/2007 | Rollinger et al. | |
| 2007/0142165 A1 | 6/2007 | Klinkner et al. | |
| 2007/0157899 A1 | 7/2007 | Seufert et al. | |
| 2010/0224149 A1* | 9/2010 | Hirschmann et al. | 123/90.15 |
| 2010/0263375 A1* | 10/2010 | Grieve | 60/612 |

* cited by examiner

*Primary Examiner* — John Walters
(74) *Attorney, Agent, or Firm* — David B. Kelley; Brooks Kushman P.C.

(57) ABSTRACT

A powertrain for a vehicle having an air intake includes an engine and an electric machine. The engine includes a manifold configured to receive intake air entering through the vehicle air intake, and a throttle disposed between the air intake and the manifold. The powertrain also includes a compressor disposed between the air intake and the manifold, and operable to compress the intake air before it enters the engine. A pressure sensor disposed downstream of the compressor and upstream of the throttle provides air pressure signals to a control system that determines a driver demand and operates the electric machine to boost torque output of the powertrain when the driver demand requires operation of the compressor and the driver demand is not met by the engine. The torque boost of the electric machine is based at least in part on signals output from the pressure sensor.

18 Claims, 3 Drawing Sheets

POWERTRAIN AND METHOD FOR CONTROLLING A POWERTRAIN IN A VEHICLE

BACKGROUND OF THE INVENTION

1. Technical Field

The present invention relates to a powertrain and method for controlling a powertrain in a vehicle.

2. Background Art

To improve fuel economy in vehicles, engines are being downsized. In order to provide sufficient torque to propel the vehicle, many smaller engines are being turbocharged. One issue related to a turbocharged engine is a phenomenon called "turbo lag". This delay exists because of the time required for the exhaust gases from the engine to accelerate the turbine and then compress the engine intake air. Another way in which vehicle fuel economy is being improved, is through the use of hybrid electric vehicles (HEV's). These vehicles typically utilize a smaller engine in combination with one or more electric machines that can be operated as motors, generators, or both. By combining these two technologies—i.e., turbocharged engines and HEV's—improved fuel economy over conventional vehicles may be realized, while still providing a vehicle that meets the torque requirements of the driver. It would be desirable, however, to provide a turbocharged HEV that did not experience the common problem of turbo lag.

SUMMARY OF THE INVENTION

Embodiments of the present invention provide a powertrain for a vehicle that includes an engine and an electric machine, each of which is operable to output torque to propel the vehicle. The engine includes a manifold configured to receive air entering through a vehicle air intake, and further includes a throttle, disposed between the air intake and the manifold, which is operable to control the air flow entering the engine. A compressor is disposed between the air intake and the manifold, and is operable to compress the intake air before it enters the engine. The compressor may be operated, for example, by a turbine which itself is operated by exhaust gases leaving the engine.

A pressure sensor is disposed downstream of the compressor and upstream of the throttle, and it is configured to sense the pressure of the air after it passes the compressor. As explained in more detail below, sensing the pressure upstream of the throttle provides advantages for controlling the electric machine to compensate for turbo lag. A control system includes at least one controller, and it is configured to determine a driver demand indicative of a demanded torque. The control system operates the electric machine to boost torque output of the powertrain when the driver demand requires operation of the compressor and the driver demand is not met by the engine. The control system further controls the torque boost of the electric machine based at least in part on signals received from the pressure sensor to maintain the torque output of the powertrain to meet the driver demand. The torque boost of the electric machine is ended when it is determined that the engine can meet the driver demand.

Embodiments of the invention also include a method for controlling a powertrain, for example, a powertrain as described above. The method includes determining when a driver demanded torque requires operation of the compressor to compress the intake air. The electric machine is operated to output positive torque such that the torque output of the powertrain is substantially equal to the driver demanded torque. The pressure of the intake air downstream of the compressor and upstream of the throttle is sensed over time, and the positive torque output of the electric machine is reduced as the sensed pressure increases. The reduction in torque output of the electric machine is controlled such that the torque output of the powertrain substantially meets driver demand—i.e., it meets driver demand within the normal limitations of the control system. Embodiments of the invention also use a desired pressure of the intake air downstream of the throttle as indicative of the driver demand, and will end the torque boost of the electric machine when the sensed pressure is within a calibrateable amount of the desired pressure.

The invention also includes embodiments wherein the step of controlling the torque boost of the electric machine to maintain the torque output of the powertrain to meet the driver demand includes determining a pressure error, and determining a torque output for the electric machine based at least in part on the pressure error. The pressure error may be, for example, the difference between the desired pressure—which is indicative of the driver demand—and the sensed pressure. Determining the torque output for the electric machine based at least in part on the pressure error may include, for example, determining a torque value for the electric machine based on the pressure error, and applying a function to the torque value such that the torque output is the greater of the torque value and zero. Such a function may be referred to as a "zero-maximum" function.

Determining the driver demand may include determining a speed of the engine, determining a position of an accelerator pedal, and then determining a desire torque based on the engine speed and the position of the accelerator pedal. Determination of the driver demand may further include determining a desired engine load based at least in part on the desired torque, and determining a desired pressure of the intake error downstream of the throttle—i.e., at the engine manifold—based at least in part on the desired engine load.

DETAILED DESCRIPTION OF EMBODIMENTS OF THE INVENTION

Figure 1:
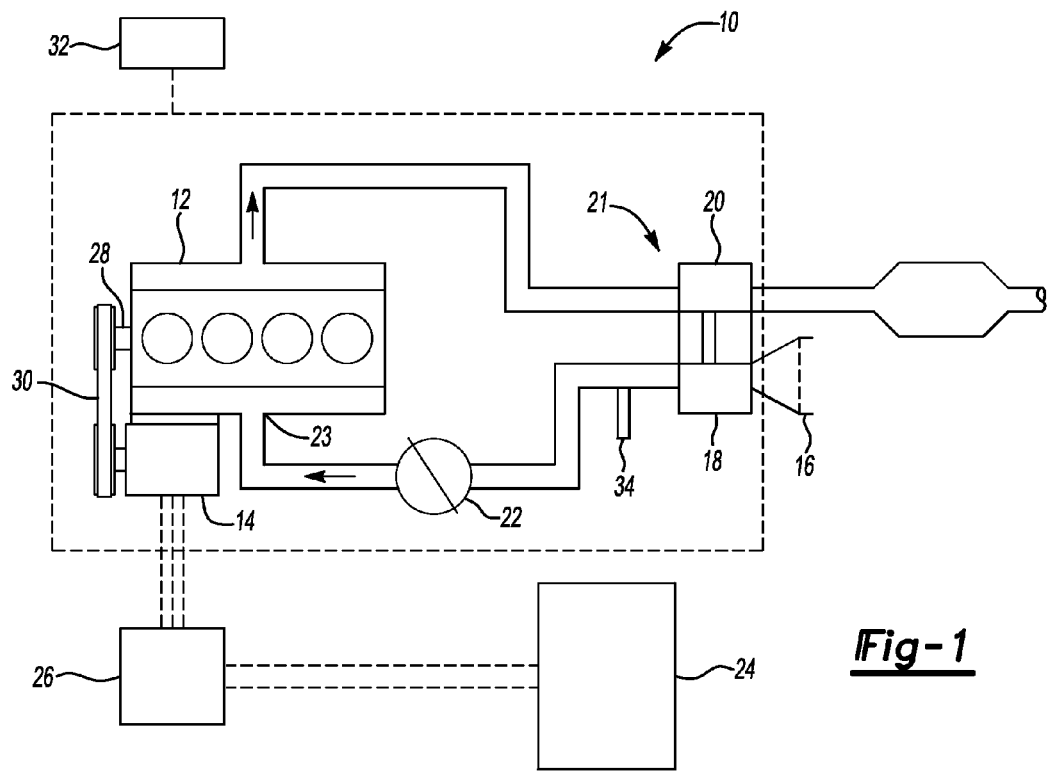
FIG. 1 is a schematic illustration of a powertrain in accordance with embodiments of the present invention.

FIG. 1 shows a portion of a powertrain 10 in accordance with an embodiment of the present invention. The powertrain 10 includes an engine 12 and an electric machine 14, both of which are operable to output torque to propel the vehicle. The electric machine 14 is a belt-driven integrated starter generator—i.e., the electric machine 14 can output torque to add to the total torque output of the powertrain 10, it can output torque as a starter motor for the engine 12, or it can receive torque as an input and operate as a generator to output electrical energy.

An air intake 16 receives engine intake air, which can be optionally compressed by a compressor 18. The compressor 18 is driven by a turbine 20 which is operated by exhaust gases leaving the engine 12. The compressor 18 and turbine 20 are two components of a turbocharger system 21. Downstream from the compressor 18 is a throttle 22, which is configured to control the flow of air into engine manifold 23.

A high voltage battery 24 supplies electrical power to, and receives electrical power from, the electric machine 14 through an inverter 26. As noted above, the electric machine 14 is a belt-driven integrated starter generator and is connected to the engine crankshaft 28 through a belt 30. As described in more detail below, a control system, illustrated in FIG. 1 as a powertrain control module (PCM) 32 controls operation of the electric machine 14, and may use inputs from a pressure sensor 34, which is disposed between the compressor 18 and the throttle 22. Although the PCM 32 represents a control system for purposes of illustration, it is understood that components of the powertrain 10, as well as other vehicle components, can be controlled by a number of different hardware controllers, software controllers, or some combination thereof, and that such controllers may communicate with each other through a communications network, such as a controller area network (CAN).

Figure 2:
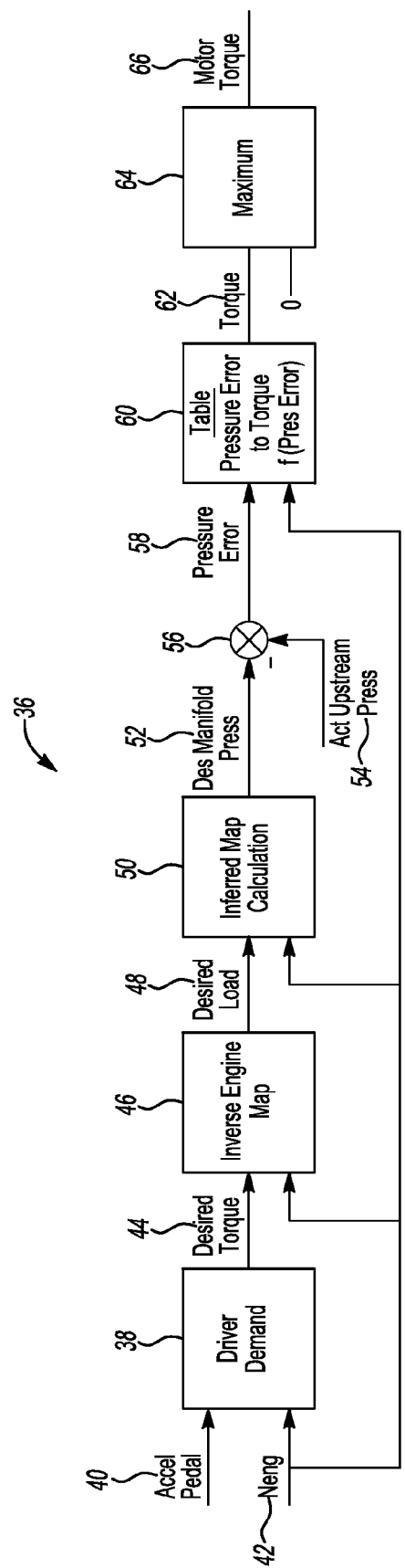
FIG. 2 is a block diagram illustrating a control method in accordance with embodiments of the present invention.

FIG. 2 is a block diagram 36 illustrating a control system in accordance with embodiments of the present invention, used for controlling a powertrain and a vehicle, such as the powertrain 10 shown in FIG. 1. The control system is used, for example, when a driver demand requires operation of the compressor 18—i.e., when the turbocharger system 21 is activated. At block 38, a driver demand is calculated based on an accelerator pedal position input 40 and an engine speed 42 of the engine 12.

The output of the driver demand 38 is a desired torque 44, which, along with an input of the engine speed 42, is fed into an inverse engine map 46. The inverse engine map 46 may be in the form of a lookup table that transforms the desired torque 44 into a desired engine load 48. The desired engine load 48 represents an amount of air desired in the engine cylinders in order for the engine 12 to output the desired torque 44. The inverse engine map 46, like the rest of the control system block diagram 36, may be programmed into the PCM 32, alone or in combination with other control modules.

The engine speed 42 is again used in an inferred map calculation 50, which also receives the desired load 48 as an input. From these inputs, a desired manifold pressure 52 is calculated and then the actual upstream pressure 54 is subtracted from the desired manifold pressure 52 at junction 56. The actual upstream pressure 54 is the air pressure measured upstream of a throttle, such as the throttle 22 shown in FIG. 1. Thus, the pressure sensor 34 shown in FIG. 1 can be used to measure the air pressure between the compressor 18 and the throttle 22, and the signal it outputs to the PCM 32 can be used in the calculation at summing junction 56 shown in FIG. 2.

The result of the summation at the summing junction 56 is a pressure error 58, which, along with the engine speed 42, is fed into a table 60 that calculates a torque value 62 for the electric machine 14. At block 64, a "zero-maximum" function is applied to the torque value 62 such that the greater of the torque value 62 or zero is output as the motor torque 66 at which the electric machine 14 will be controlled. This prevents operation of the electric machine 14 with a negative output torque.

Figure 3:
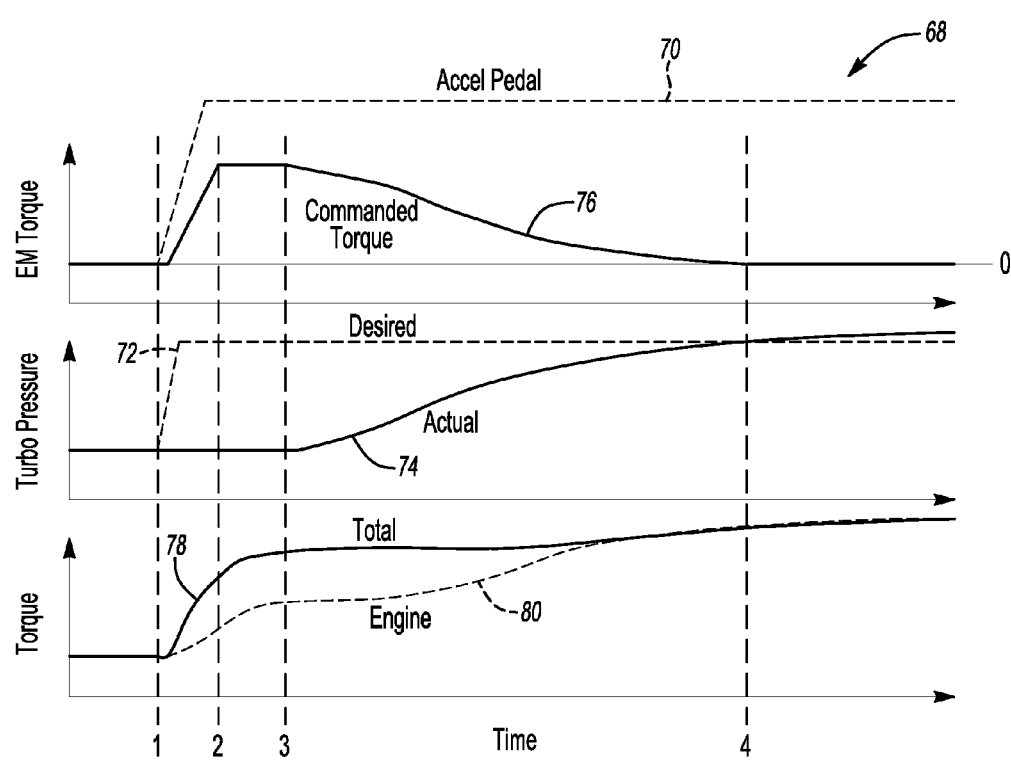
FIG. 3 is a graph illustrating the relationship between motor torque, engine torque and air pressure for the powertrain illustrated in FIG. 1.

FIG. 3 shows a graph 68 illustrating the changes in motor torque, air pressure and engine torque as a control method of the present invention—e.g., see FIG. 2—is performed. In the graph 68, driver demanded torque 70 is determined, at least in part, by an accelerator pedal position 70 at time T=1, the accelerator pedal is depressed. Here, the driver demand requires operation of the compressor 18 to meet the desired torque level. This is illustrated as a desired air pressure 72 for the manifold 23 of the engine 12. As shown in FIG. 3, the actual, or measured, air pressure is well below the desired air pressure 72 shortly after time T=1. As used in the present invention, the actual air pressure 74 is not the actual manifold air pressure, but rather, the pressure measured upstream of the throttle 22, for example, such as measured by the pressure sensor 34 shown in FIG. 1. The pressure measured by the sensor 34 will almost always be higher than the air pressure in the manifold 23 because of flow restrictions imposed by the throttle 22. As explained in more detail below, using a pressure measurement upstream of the throttle 22 to control the electric machine 14 to compensate for turbo lag provides advantages over systems that would directly measure the pressure in the engine manifold.

As shown in FIG. 3, an increase in air pressure caused by operation of the compressor 18 does not begin until after time T=3, and then it increases gradually until time T=4. To compensate for this lag, embodiments of the present invention use the electric machine 14 to boost the torque output of the powertrain 10, for example, in accordance with the control method illustrated in FIG. 2. As shown in FIG. 3, the initial torque boost provided by the electric machine 14, shown as commanded torque 76, rises quickly in response to the driver demanded torque 70. Thus, the total powertrain torque 78 meets the driver demand for torque by combining engine torque 80 with the torque 76 of the electric machine 14. At time T=3, the torque 76 of the electric machine 14 is controlled according to a function of the inverse of the increase in the pressure sensed by the pressure sensor 34. Thus, the torque 76 of the electric machine 14 is reduced during times T=3-4 while the sensed pressure 74—and the engine torque 80—increases. At time T=4, the sensed pressure 74 is within a calibrateable level of the desired pressure 72, and the torque boost provided by the electric machine 14 is ended.

Figure 4:
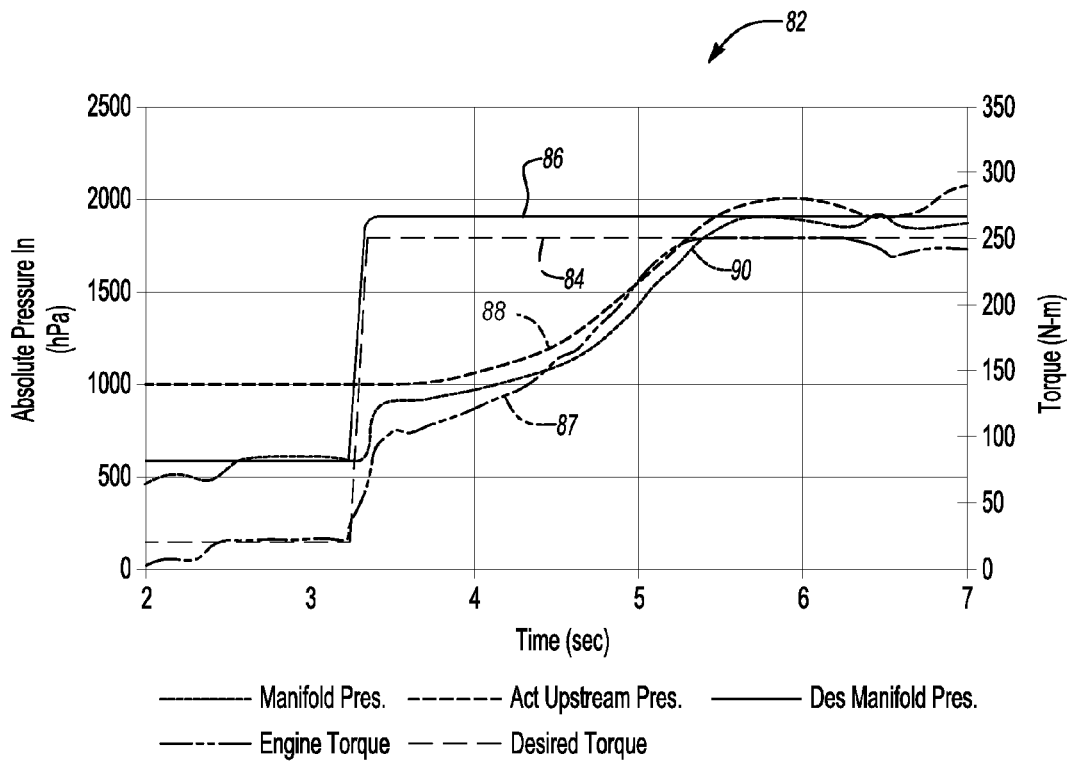
FIG. 4 is a graph illustrating the relationship between various air pressures and torques for the powertrain illustrated in FIG. 1.

FIG. 4 illustrates the relationship between various air pressures and torques of the powertrain 10 shown in FIG. 1 when driver demand requires operation of the compressor 18. At approximately 3.25 seconds the accelerator pedal in a vehicle is tipped in and driver demand increases significantly. This is illustrated in the graph 82 in FIG. 4 by the desired torque line 84 and the desired manifold pressure line 86. Actual engine torque is shown by the engine torque line 87. In the graph 82, the electric machine 14 is not operated to provide the torque boost as described above; however, the graph 82 illustrates a feature of the present invention in that it shows the difference between the pressure 88 measured upstream of the throttle, for example, by the pressure sensor 34 shown in FIG. 1, and the actual manifold pressure 90.

As shown in the graph 82, the upstream pressure 88 is almost always greater than the manifold pressure 90. One advantage of this is that once the manifold pressure 90 reaches the desired manifold pressure 86, the upstream pressure 88 will almost always remain above the desired manifold pressure 86. In contrast, the manifold pressure 90 will at times dip below the desired manifold pressure 86. Controlling the torque boost of the electric machine 14 in accordance with an upstream pressure, such as the pressure 88, is very robust in that the electric machine 14 will not be unnecessarily stopped and started to add additional boosts after the desired manifold pressure has been reached. This is in contrast to a control system that uses the actual manifold pressure to control the torque boost of an electric machine. For example, using the manifold pressure 90 shown in the graph 82 to control torque boost might result in the starting and stopping of an electric machine an additional two or three times after the 5.5 second mark when the manifold pressure 90 oscillates to periodically dip below the desired manifold pressure 86.

Figure 5:
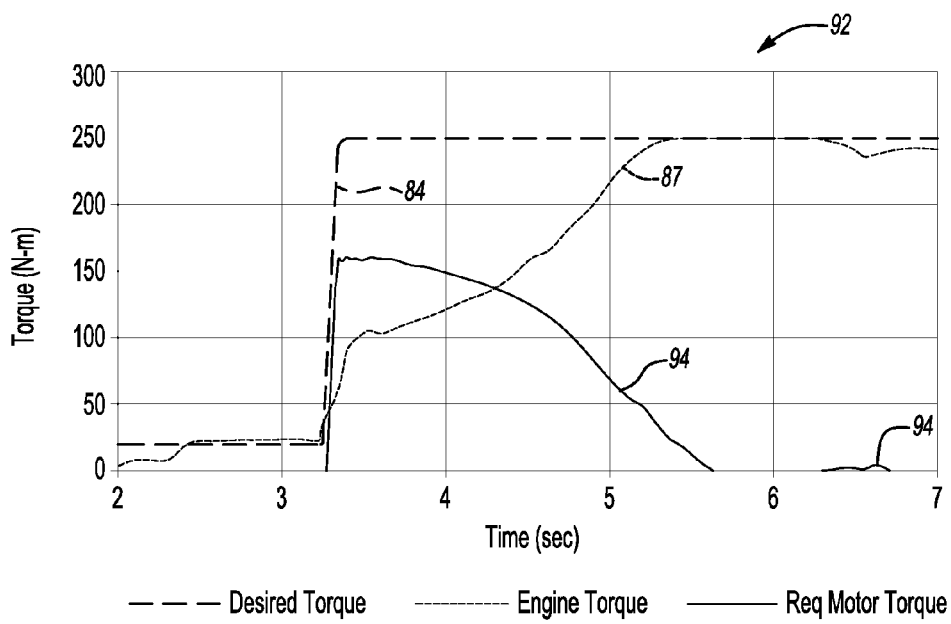
FIG. 5 is a graph illustrating the relationship between a desired torque, an engine torque, and the requested motor torque in accordance with embodiments of the present invention.

FIG. 5 shows a graph 92 that illustrates an implementation of the present invention to add a torque boost of the electric machine 14 to the powertrain 10 to compensate for turbo lag. Once again, at approximately 3.25 seconds, the accelerator pedal is tipped in and the driver demand for torque increases significantly. This is illustrated by the desired torque line 84. This increased driver demand for torque requires that the compressor 18 be operated to provide compressed intake air to the engine 12 to meet the driver demand. As described and illustrated above, the output torque 87 of the engine 12 gradually increases over time until it finally reaches the desired torque level 84 at approximately 5.5 seconds. In the interim, the electric machine 14 is operated to add a torque boost that initially spikes and then undergoes a controlled reduction as the engine torque 87 increases—see the requested motor torque line 94.

As shown in FIG. 5, the sum of the engine torque 87 and the requested motor torque 94 approximately equals the desired torque output 84, but only after about 3.4 seconds. In this example, there is a very small delay between the initial motor torque boost at 3.25 seconds and the time at which the combined engine and motor torques equal the desired torque output 84. This brief delay is due at least in part to the time it takes for the air pressure in the engine manifold 23 to reach the upstream air pressure measured by sensor 34.

As described above, the reduction in output torque 94 of the electric machine 14 is generally a function of the increase in pressure measured upstream of the throttle 22. The actual requested motor torque 94 illustrated in FIG. 5, can be, for example, determined in accordance with the control method shown in FIG. 2, such that the torque 66 in FIG. 2 represents the requested motor torque 94 shown in FIG. 5. As described above, the zero-maximum function 64 clips the calculated torque value 62 so that it never drops below zero. This is shown in FIG. 5, where the requested motor torque line 94 is absent between approximately 5.5 seconds and 6.4 seconds. Using a control method, such as shown in FIG. 2, ensures that the electric machine 14 will not be commanded to output a negative torque during this time of high driver demand. Therefore, controlling an electric machine using a zero-maximum function, such as illustrated in FIG. 2, and an air pressure measured upstream from the throttle 22 instead of the actual manifold pressure, provides a robust and effective control method to reduce or eliminate the turbo lag associated with an exhaust gas, turbine operated intake air compressor.

While the best mode for carrying out the invention has been described in detail, those familiar with the art to which this invention relates will recognize various alternative designs and embodiments for practicing the invention as defined by the following claims.

What is claimed:

1. A method for controlling a powertrain in a vehicle, the powertrain including an engine and an electric machine, each of which is operable to output torque to propel the vehicle, the vehicle including an air intake for receiving engine intake air, a compressor operable to compress the intake air before it enters the engine, and a throttle disposed between the air intake and the engine for controlling an amount of intake air entering the engine, the method comprising:

determining a driver demand indicative of a demanded torque;

boosting torque output of the powertrain with the electric machine when the driver demand requires operation of the compressor and the driver demand is not met by the engine;

sensing over time a pressure of the intake air downstream of the compressor and upstream of the throttle;

controlling the torque boost of the electric machine based at least in part on the sensed pressure to maintain the torque output of the powertrain to meet the driver demand; and ending the torque boost of the electric machine when it is determined that the engine can meet the driver demand.

2. The method of claim 1, wherein the driver demand is a desired pressure of the intake air downstream of the throttle, and the torque boost of the electric machine is ended when the sensed pressure is within a calibrateable amount of the desired pressure.

3. The method of claim 2, wherein the step of controlling the torque boost of the electric machine to maintain the torque output of the powertrain to meet the driver demand includes:

determining a pressure error defined as the difference between the desired pressure and the sensed pressure, and determining a torque output for the electric machine based at least in part on the pressure error.

4. The method of claim 3, wherein the step of determining a torque output for the electric machine based at least in part on the pressure error includes:

determining a torque value for the electric machine based on the pressure error, and applying a function to the torque value such that the torque output is the greater of the torque value and zero.

5. The method of claim 1, wherein the vehicle further includes an accelerator pedal, and the step of determining a driver demand includes:

determining a speed of the engine, determining a position of the accelerator pedal, and determining a desired torque based on the engine speed and the position of the accelerator pedal.

6. The method of claim 5, wherein the step of determining a driver demand further includes:

determining a desired engine load based at least in part on the desired torque, and determining a desired pressure of the intake air downstream of the throttle based at least in part on the desired engine load.

7. A method for controlling a powertrain in a vehicle, the powertrain including an engine and an electric machine, each of which is operable to output torque to propel the vehicle, the vehicle including an air intake for receiving engine intake air, a compressor operable to compress the intake air entering the engine, and a throttle disposed between the air intake and the engine for controlling an amount of intake air entering the engine, the method comprising:

determining when a driver demanded torque requires operation of the compressor to compress the intake air;

operating the electric machine to output positive torque such that the torque output of the powertrain is substantially equal to the driver demanded torque;

sensing over time a pressure of the intake air downstream of the compressor and upstream of the throttle; and reducing the positive torque output of the electric machine as the sensed pressure increases such that the torque output of the powertrain remains substantially equal to the driver demanded torque.

8. The method of claim 7, further comprising:
determining a desired pressure of the intake air based on the driver demanded torque; and
ceasing the positive torque output of the electric machine when the sensed pressure is within a calibrateable amount of the desired pressure.

9. The method of claim 8, wherein the desired pressure of the intake air is a desired pressure downstream of the throttle.

10. The method of claim 9, wherein the step of reducing the positive torque output of the electric machine includes:
determining a pressure error defined as the difference between the desired pressure and the sensed pressure, and determining a torque output for the electric machine based at least in part on the pressure error.

11. The method of claim 10, wherein the step of determining a torque output for the electric machine based at least in part on the pressure error includes:
determining a torque value for the electric machine based on the pressure error, and
clipping the torque value at zero to determine the torque output.

12. The method of claim 7, wherein the positive torque output of the electric machine is reduced according to a function of the inverse of the increase in the sensed pressure.

13. A powertrain for a vehicle having an air intake, comprising:
an engine operable to output torque to propel the vehicle, the engine including a manifold configured to receive intake air entering through the vehicle air intake and a throttle disposed between the air intake and the manifold operable to control the air flow from the air intake to the manifold;
an electric machine operable to output torque to propel the vehicle;
a compressor disposed between the air intake and the manifold and operable to compress the intake air before it enters the engine;
a pressure sensor disposed downstream of the compressor and upstream of the throttle and configured to sense the pressure of the air flowing thereby; and
a control system including at least one controller and configured to:
determine a driver demand indicative of a demanded torque,
operate the electric machine to boost torque output of the powertrain when the driver demand requires operation of the compressor and the driver demand is not met by the engine,
control the torque boost of the electric machine based at least in part on signals received from the pressure sensor to maintain the torque output of the powertrain to meet the driver demand, and
ending the torque boost of the electric machine when it is determined that the engine can meet the driver demand.

14. The powertrain of claim 13, wherein the driver demand is a desired pressure of the intake air in the engine manifold, and the control system is configured to end the torque boost of the electric machine when a signal from the pressure sensor indicates that the sensed pressure is within a calibrateable amount of the desired pressure.

15. The powertrain of claim 14, wherein the control of the torque boost of the electric machine is effected by the control system determining a pressure error defined as the difference between the desired pressure and the sensed pressure, and determining a torque output for the electric machine based at least in part on the pressure error.

16. The powertrain of claim 15, wherein the determination of the torque output for the electric machine is effected by the control system determining a torque value for the electric machine based on the pressure error, and applying a function to the torque value such that the torque output is the greater of the torque value and zero.

17. The powertrain of claim 13, wherein the vehicle further includes an accelerator pedal, and the determination of the driver demand is effected by the control system determining: a speed of the engine, a position of the accelerator pedal, and a desired torque based on the engine speed and the position of the accelerator pedal.

18. The powertrain of claim 17, wherein the determination of the driver demand is further effected by the control system determining: a desired engine load based at least in part on the desired torque, and a desired pressure of the intake air in the engine manifold based at least in part on the desired engine load.

* * * * *